United States Patent [19]

Wartelle et al.

[11] Patent Number: 4,498,799

[45] Date of Patent: Feb. 12, 1985

[54] BALL AND SOCKET JOINT AND METHOD OF FORMING IT

[75] Inventors: Claude Wartelle; Charles Favey, both of Gouvieux, France

[73] Assignee: Centre Technique Des Industries Mecaniques, Senlis, France

[21] Appl. No.: 293,180

[22] Filed: Aug. 17, 1981

[30] Foreign Application Priority Data

Aug. 20, 1980 [FR] France ................................ 80 18177

[51] Int. Cl.[3] ................................................ F16C 11/06

[52] U.S. Cl. ................................ 403/140; 29/149.5 B; 384/209

[58] Field of Search ........................ 403/122, 141, 140; 29/149.5 B, 441; 384/209, 208, 211, 210

[56] References Cited

U.S. PATENT DOCUMENTS

| | | | |
|---|---|---|---|
| 2,730,960 | 1/1956 | Krause | 403/140 X |
| 3,263,311 | 8/1966 | Riedhammer et al. | 29/441 X |
| 3,367,728 | 2/1968 | Labbie | 403/122 X |

*Primary Examiner*—Andrew V. Kundrat

*Attorney, Agent, or Firm*—Holman & Stern

[57] ABSTRACT

A ball and socket joint for use in mechanical linkages, especially for ball-ended connecting rods in a multi-cylinder hydraulic pump comprises a ball head forcibly inserted into a socket which extends over more than a hemisphere and which is formed as a cylindrical seating member. Radial slits around the mouth of the socket allow the necessary distortion and then the mouth of the socket is squeezed and held by a hoop or ring or counter-plates, and the seating member is inserted in a cylindrical recess in a further component.

10 Claims, 5 Drawing Figures 12 3 5 8 16 18 F 4 17

5
4
8
9
1
2
11
7
6
3
10

10
5
3
2
1
6
9

15
2
1
13
9
3
14
10

12
3
5
8
16
18
F 4
17

BALL AND SOCKET JOINT AND METHOD OF FORMING IT

SPECIFIC DESCRIPTION

BACKGROUND OF THE INVENTION

1. Field of the Invention

This invention relates to ball and socket joints such as are used in mechanical linkages, and is concerned with a construction of such a joint, as well as a method of assembling it together.

2. Description of the Prior Art

In mechanical engineering, rods or links having ball ends engaging in sockets in other components are used for transmitting forces and couples. There is a need for such a construction in a hydraulic pump of the variable delivery type, employing an oscillating barrel, such as that described in French Patent Application No. 78 16406 filed by the assignees of the present applicant on June 2, 1978 with the title "Multi-Cylinder Variable Delivery Hydraulic Pump/Motor".

In such machines the relative movements of the parts require that the joint should transmit both compressive and tensile forces, and also forces of varying direction, between a piston and a connecting rod and between the connecting rod and the driving or output shaft.

Hitherto such a ball and socket joint has been formed by:

(1) Inserting the spherical ball head into an appropriately shaped socket in the other component and then peening over or swaging in the mouth of the socket.

(2) Using a split socket made of two half-shells which are secured together around the ball head.

(3) Forming a hemispherical part-socket in the component, and clamping the ball head into it without any play by means of a counter-plate which also has formed in it a part-spherical socket, the part-spherical surfaces in the component and in the counter plate being guided to be accurately coaxial, or (4) Forming a hemispherical part-socket in the component and completing the socket by a counterplate of which the alignment is achieved automatically. In this case the clearance or play between the ball head and the socket has to be controlled on assembly by the degree of deformation of the counter-plate, and this is a tricky operation to control accurately.

In the case of the multi-cylinder pump mentioned above, the control of the clearance is further complicated by the fact that several connecting rods have to be connected to a common component by the use of a single counter-plate, and in practice it is almost impossible, because of manufacturing tolerances, to obtain equal clearances in all the joints.

BRIEF SUMMARY OF THE INVENTION

The aim of the invention is to provide a form of ball and socket joint which overcomes the drawbacks of the known constructions.

According to the invention there is proposed a ball and socket joint for connecting a ball-ended rod to another component, comprising an externally cylindrical seating member having formed in it a part-spherical socket extending over more than a hemisphere, the mouth of the socket having around its periphery a number of circumferentially spaced slits which extend axially, away from the mouth, at least as far as that plane through the center of the spherical surface which is perpendicular to the axis of the mouth, and a cylindrical recess in the said other component for receiving the said cylindrical seating member.

Thus the slits impart sufficient flexibility to the mouth of the socket to allow the ball head to be forced into place, but then when the seating member is inserted into the other component the mouth of the socket is forcibly closed to its former state.

The internal part-spherical surface of the socket may contain an annular groove coaxial with the mouth of the socket and smaller than the diameter of the socket.

The said other component could be of split form, comprising two parts meeting in a plane containing the axis of the mouth of the socket.

The seating member could have in addition a hoop-like ring that fits around its mouth to prevent expansion after the ball head has been inserted.

In the method of forming the ball and socket joint, of the invention the ball head is inserted into a socket in a separate cylindrical seating member of the kind described above, by forcing the ball head into the socket, with expansion of the mouth of the socket, and then the mouth is closed up to its former shape, either by inserting the seating member into a cylindrical recess in the said other component or by applying an external hoop, or by applying some other form of external squeeze on the mouth of the socket.

The external squeeze could be applied by a pair of matching counter-plates, each with a semi-circular notch the plates being drawn together and towards the said other component.

If the seating member is made of a resilient material, such as plastics, it will return to its original shape automatically after insertion of the ball, being then held to that shape by the hoop, or counter-plates, or simply by the said other component. If on the other hand it is made of metal, which must have a certain amount of ductility, the act of applying the squeeze, or of inserting it into the said other component, will restore, and then hold, its shape.

BRIEF DESCRIPTION OF THE DRAWINGS

The invention will now be further described by way of example with reference to the accompanying drawings which illustrate an embodiment and some modifications wherein.

DETAILED DESCRIPTION

Figure 1:
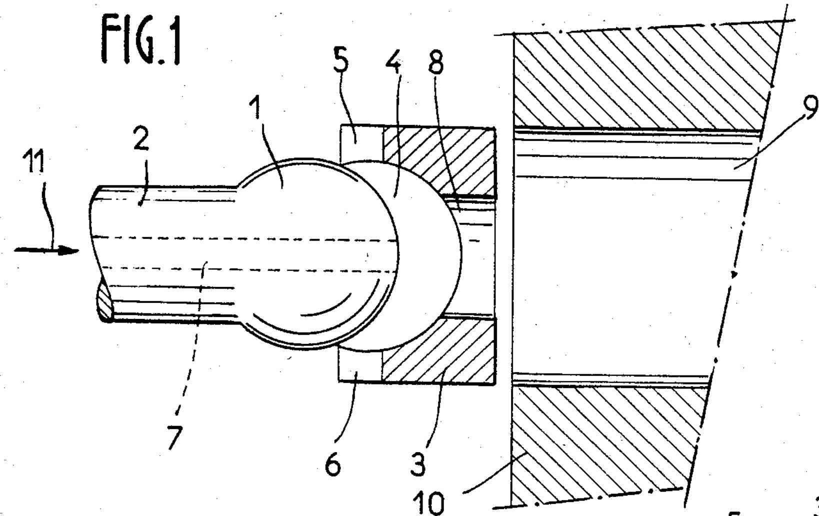
FIG. 1 is a diagrammatic cross-sectional view of the parts of the joint before assembly in accordance with the invention.
Figure 2:
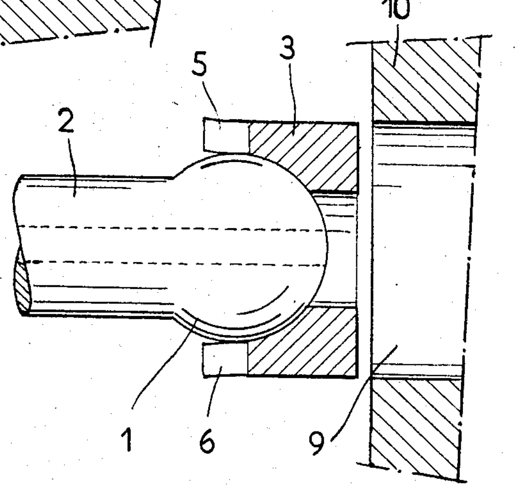
FIG. 2 is a view similar to FIG. 1, but showing the ball head inserted into the socket.
Figure 3:
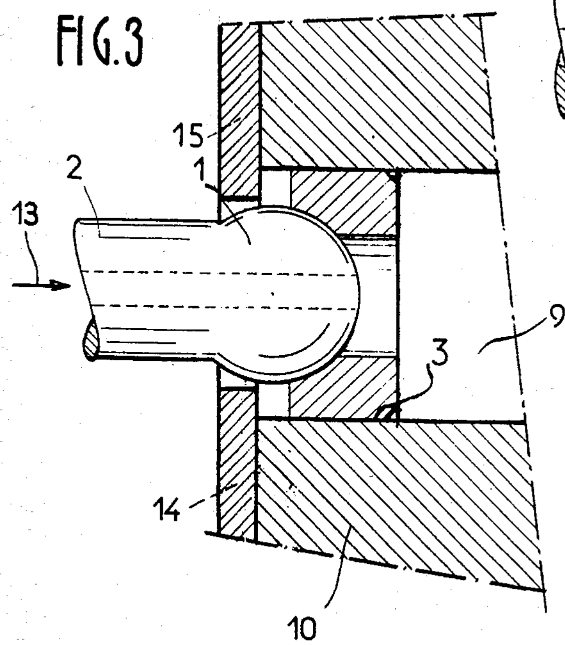
FIG. 3 is a cross-sectional view showing the parts fully assembled together.

In the version illustrated in FIGS. 1 to 3 a ball head 1 on the end of a force-transmitting connecting rod 2 is to be fitted into a separate cylindrical seating member 3, which has in it a part-spherical socket 4 which extends over more than a hemisphere. Around the mouth of the socket are formed circumferentially spaced radial slits, of which two are visible at 5 and 6.

In the embodiment illustrated, the rod 2 is hollow, having a passage 7 through it which also extends through the ball head 1, and the seating member 3 has an opening 8 forming a passage at the end opposite the mouth of the socket.

The seating member 3 is designed to be received in an appropriately dimensioned cylindrical recess 9 formed in a component 10 to which the rod 2 is to be connected by the joint according to the invention.

When the ball head 1 is forced into the socket 4 by exerting an axial force in the direction of the arrow 11 in FIG. 1, the mouth of the socket is distended by the ball, this distension being allowed by the presence of the slits 5, 6, which extend axially at least as far as that plane which passes through the center of the socket and is perpendicular to the axis of the mouth.

Figure 4:
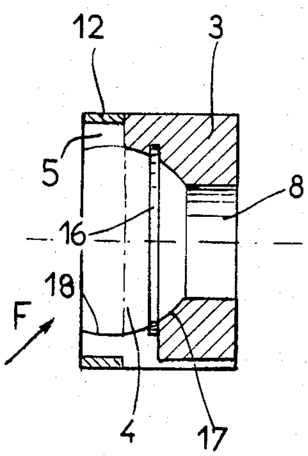
FIG. 4 is a cross-sectional view through a modified form of seating member in accordance with the invention.

If the member 3 is made of plastics material it will spring back to its original shape of its own accord. However, to ensure that it stays this way, i.e. with the slits 5, 6 closed up, a hoop 12 could be subsequently fitted around the mouth of the socket, as shown in FIG. 4.

Where the member 3 is made of metal, the act of forcing it into the recess 9 in the component 10, with the full head in it, will force the distended mouth of the socket back into shape. The arrow 13 in FIG. 3 indicates the application of the force.

In a further modification, the restoration of the shape, i.e. the squeezing of the mouth of the socket, could be achieved by the use of two complimentary counterplates 14 and 15, shown in FIG. 3, which have cooperating semicircular notches that fit around the mouth of the socket and are secured to the component 10.

The number of slits 5, 6 will depend on the material. It should be at least two, and is preferably four or six.

The invention could be used in a case where the member 3 itself forms a hydraulic piston, sliding in a cylinder formed by the component 10. It would then be arranged that there is a working clearance between the member 3 and the cylinder 10. Where the component 10 is a shaft or other body, the fit of the member 3 in the component could be a deliberately tight one, so that it actually applies a compression to the member 3 and takes up any clearance there might be between the ball head 1 and the socket 4.

The construction according to the invention allows lubrication of the joint and hydraulic balance of the force transmitted by the rod 2. A hole, fed with oil, may be provided in a known manner in the rod, and an annular groove 16 (FIG. 4) in the socket, coaxial with the mouth of the socket and smaller in diameter, forms an oilway leading into a passage communicating with the surroundings through the slit 5 or 6.

In such an embodiment as shown in FIG. 4, such passage may be along the part 17 of the hemispherical socket 4 which extends from opening 8 to slots 5,6. The opening 8 and the surface of part 17 forms a hydrostatic thrust bearing partly balancing the axial component of a force exerted in the direction of the arrow F. In practice the pressure of the oil exerts its full force on the ball where it faces opening 8 and only a partial force at the level of part 17, while the remainder of the axial force and the radial force are supported by the bearing surface 18, which is lubricated under low pressure by oil from the groove 16.

The groove 16 functions to channel away leakage, and thereby avoids putting the portion 18 of the surface of the socket under higher pressure.

Figure 5:
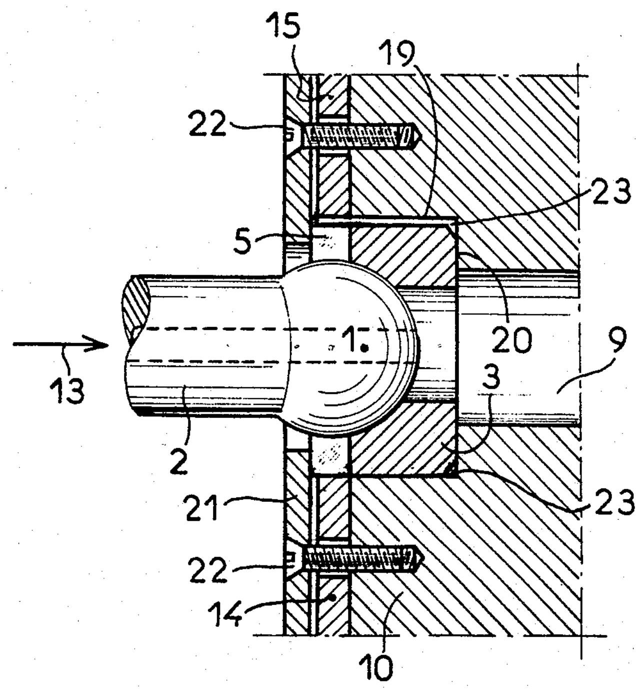
FIG. 5 is a cross-sectional view through the completed assembly of a further modification of the invention.

The modification shown in FIG. 5 is suitable for forming a joint with a ball-ended rod where there is no other displacement or pivotal movement. Here the cylindrical seating member 3 engages against a shoulder 20 formed by a counterbore in the recess 9 in the component 10. The member 3 is firmly held in place by an apertured plate 21, clamped to the component 10 by screws 22.

To avoid the development of excess hydraulic pressure which could lead to the member 3 being urged away from the shoulder 20, the member 3 has a chamfer 23 communicating with an axial groove 19, cut in the external cylindrical wall of the member 3. This groove 19 leads into one of the slits 5, 6 and thence to the surroundings.

It will be understood that the invention is not limited to the embodiments described and illustrated but is open to modifications available to a person skilled in the art, without departing from the invention which is defined by the claims which follow. For example, the groove 19 could be replaced by a passage formed not in the member 3 but in the component 10, and leading to the surroundings or to an oil reservoir.

We claim:

1. A ball and socket joint assembly comprising a ball head on the end of a rod, an externally cylindrical seating member, a part-spherical socket in said seating member having a surface larger than a hemisphere for receiving said ball head, a mouth for said socket in said seating member coaxial with the external cylindrical surface of said member, a set of circumferentially spaced radial slits in said seating member extending radially from said socket to the external surface of said seating member and axially from said mouth at least as far as a plane passing through the center of said socket and extending perpendicular to the axis of said external cylindrical surface of said seating member, a further component, a cylindrical recess in said component adapted to receive and fit said seating member, means for squeezing and holding said seating member around said mouth, an annular oil groove in said seating member coaxial with said mouth and extending radially outwardly from a position in said socket displaced from a plane passing through the center of said socket on the side thereof opposite said mouth so that the inner diameter of said groove is smaller than the diameter of said socket, and an opening through said seating member coaxial with said mouth and communicating with said socket, said oil groove communicating with said opening and said slits to provide pressure relief between said cylindrical recess in said further component and said external cylindrical surface of said seating member.

2. The joint assembly set forth in claim 1 wherein said component comprises two parts meeting in a plane containing the axis of said recess.

3. The joint assembly set forth in claim 1 wherein said means for squeezing and holding comprises an external hoop-like clamping ring around said seating member adjacent said mouth.

4. The joint assembly set forth in claim 1 and further comprising a shoulder in said recess against which said seating member engages, a chamfered edge on said seating member adjacent said shoulder and an axial slot in the cylindrical surface of said seating member extending between said chamfered edge and at least one of said slits.

5. A ball and socket joint assembly according to claim 1 made by the process of forcibly inserting said ball head into said socket through said mouth thereby distorting the material of said seating member around said mouth and opening said slits, and thereafter squeezing said seating member around said mouth and re-closing said slits, by the application of externally applied force during assembly by a part of the assembly.

6. The joint assembly as claimed in claim 3 wherein said seating member is made of resilient material.

7. The joint assembly as claimed in claim 1 wherein said squeezing and holding means comprises a pair of complementary counter-plates, having semicircular notches therein fitting around said member in the region of said mouth and secured to said further component.

8. A ball and socket joint assembly comprising a ball head on the end of a rod, an externally cylindrical seating member, a part-spherical socket in said seating member having a surface larger than a hemisphere for receiving said ball head, a mouth for said socket in said seating member coaxial with the external cylindrical surface of said member, a set of circumferentially spaced radial slits in said seating member extending radially from said socket to the external surface of said seating member and axially from said mouth at least as far as a plane passing through the center of said socket and extending perpendicular to the axis of said external cylindrical surface of said seating member, a further component, a cylindrical recess in said component adapted to receive and fit said seating member, and means for squeezing and holding said seating member around said mouth comprising an external hoop-like clamping ring around said seating member adjacent said mouth.

9. The joint assembly as claimed in claim 8 wherein said seating member is made of resilient material.

10. A ball and socket joint assembly comprising a ball head on the end of a rod, an externally cylindrical seating member, a part-spherical socket in said seating member having a surface larger than a hemisphere for receiving said ball head, a mouth for said socket in said seating member coaxial with the external cylindrical surface of said member, a set of circumferentially spaced radial slits in said seating member extending radially from said socket to the external surface of said seating member and axially from said mouth at least as far as a plane passing through the center of said socket and extending perpendicular to the axis of said external cylindrical surface of said seating member, a further component, a cylindrical recess in said component adapted to receive and fit said seating member, means for squeezing and holding said seating member around said mouth, and a pressure relieving passage between said recess in said further component and said external cylindrical surface of said seating member.

* * * * *

UNITED STATES PATENT AND TRADEMARK OFFICE
CERTIFICATE OF CORRECTION

PATENT NO. : 4,498,799

DATED : February 12, 1985

INVENTOR(S) : Claude Wartelle, Charles Favey & Alain Denamur

It is certified that error appears in the above—identified patent and that said Letters Patent is hereby corrected as shown below:

On the title page:
[75] Inventors: Claude Wartelle; Charles Favey, both of Gouvieux, France and Alain Denamur of Senlis, France

Signed and Sealed this

*Eighteenth* Day of *June 1985*

[SEAL]

*Attest:*

DONALD J. QUIGG

*Attesting Officer* *Acting Commissioner of Patents and Trademarks*